(12) United States Patent  
Sato et al.

(10) Patent No.: US 10,162,485 B2  
(45) Date of Patent: Dec. 25, 2018

(54) ELECTRONIC APPARATUS AND NON-TRANSITORY COMPUTER-READABLE STORAGE MEDIUM

(71) Applicant: KYOCERA Document Solutions Inc., Osaka-shi, Osaka (JP)

(72) Inventors: Yasuhide Sato, Osaka (JP); Yoshihiko Arai, Osaka (JP); Yuri Moritani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 331 days.

(21) Appl. No.: 15/134,239

(22) Filed: Apr. 20, 2016

(65) Prior Publication Data

US 2016/0320928 A1 Nov. 3, 2016

(30) Foreign Application Priority Data

Apr. 28, 2015 (JP) ................................. 2015-091720

(51) Int. Cl.
*G06F 3/14* (2006.01)
*G06F 3/0482* (2013.01)

(52) U.S. Cl.
CPC ................................. *G06F 3/0482* (2013.01)

(58) Field of Classification Search
CPC ..................................... G06F 3/14; G06F 3/17
USPC .................. 715/716, 811; 345/158; 348/841; 705/7.26; 370/331
See application file for complete search history.

(56) References Cited

U.S. PATENT DOCUMENTS

| | | | | |
|---|---|---|---|---|
| 6,621,532 B1* | 9/2003 | Mandt | ................... | G06F 3/0482 348/841 |
| 2005/0182640 A1* | 8/2005 | Takano | ................... | G06Q 40/08 705/325 |
| 2008/0285517 A1* | 11/2008 | Igarashi | ............ | H04M 1/72552 370/331 |
| 2010/0141578 A1* | 6/2010 | Horiuchi | ................. | G06F 3/017 345/158 |
| 2010/0211875 A1* | 8/2010 | Matsushita | ........... | G06F 3/0482 715/716 |
| 2015/0073855 A1* | 3/2015 | Akita | ..................... | G06Q 10/06 705/7.26 |

FOREIGN PATENT DOCUMENTS

| | | |
|---|---|---|
| JP | 2005182313 A | 7/2005 |
| JP | 2006119920 A | 5/2006 |
| JP | 2011107915 A | 6/2011 |
| JP | 2011175576 A | 9/2011 |

(Continued)

*Primary Examiner* — Ruay Ho  
(74) *Attorney, Agent, or Firm* — Alleman Hall Creasman & Tuttle LLP

(57) ABSTRACT

A display apparatus includes a display, a function setting circuit, a switching control circuit, and a simple menu creation control circuit. The simple menu creation control circuit creates, when it is determined by the switching control circuit that a number of times of selection is greater than or equal to a set number or an elapsed time is greater than or equal to a set time, a first simple menu for use in display on the display, the first simple menu being obtained by eliminating, from the plurality of operation menu items, an operation menu item corresponding to a function whose number of times of selection by a user is greater than or equal to a set number.

5 Claims, 7 Drawing Sheets

(56) References Cited

FOREIGN PATENT DOCUMENTS

| JP | 2012168594 A | 9/2012 |
| JP | 2013161406 A | 8/2013 |
| JP | 2014026543 A | 2/2014 |
| JP | 2014026546 A | 2/2014 |

* cited by examiner

US 10,162,485 B2

ELECTRONIC APPARATUS AND NON-TRANSITORY COMPUTER-READABLE STORAGE MEDIUM

INCORPORATION BY REFERENCE

This application is based upon and claims the benefit of priority from the corresponding Japanese Patent Application No. 2015-091720 filed on Apr. 28, 2015, the entire contents of which are incorporated herein by reference.

BACKGROUND

The present disclosure relates to an electronic apparatus having a function of assisting operation inputs.

It is conceivable that when performing auxiliary display due to an erroneous input operation, an apparatus for assisting operation inputs reduces the number of operation menu items to be displayed, thereby saving the time required for reselection operation.

Also, in order to improve the operability for the user during instructing execution of a function, it is conceivable that the apparatus displays the operation menu items after limiting the operation menu items to those that are highly likely to be used by the user.

Furthermore, it is conceivable that the apparatus sequentially displays input screens corresponding to the level of operation skill of the operator.

SUMMARY

A display apparatus according to an aspect of the present disclosure includes a display, a function setting circuit, a switching control circuit, and a simple menu creation control circuit. The display selectably displays a plurality of operation menu items. The function setting circuit is capable of receiving selection of a specific operation menu item from among the plurality of operation menu items on the display and setting a specific function among a plurality of functions. The switching control circuit determines whether, without the specific function being set, a number of times of selection of the operation menu item is greater than or equal to a set number or an elapsed time since start of selection of the operation menu item is greater than or equal to a set time. The simple menu creation control circuit creates, when it is determined by the switching control circuit that the number of times of selection is greater than or equal to the set number or the elapsed time is greater than or equal to the set time, a first simple menu for use in display on the display, the first simple menu being obtained by eliminating, from the plurality of operation menu items, an operation menu item corresponding to a function whose number of times of selection by a user is greater than or equal to a set number.

A storage medium according to another aspect of the present disclosure is a non-transitory computer-readable storage medium having stored therein an operation screen display program for causing a computer to perform: selectably displaying a plurality of operation menu items; receiving selection of a specific operation menu item from among a plurality of operation menu items displayed by the displaying, and setting a specific function among a plurality of functions; determining whether, without the specific function being set, a number of times of selection of the operation menu item is greater than or equal to a set number or an elapsed time since start of selection of the operation menu item is greater than or equal to a set time; and, when it is determined that the number of times of selection is greater than or equal to the set number or the elapsed time is greater than or equal to the set time, creating a first simple menu for use in the displaying, the first simple menu being obtained by eliminating, from the plurality of operation menu items, an operation menu item corresponding to a function whose number of uses by a user is greater than or equal to a set number.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the case of performing display for immediately reducing the number of operation menu items due to an erroneous operation, there is the problem that the number of the operation menu items may be reduced inappropriately. Also, in the case of displaying the operation menu items after limiting the operation menu items to those operation menu items that are highly likely to be used by the user, there is the problem that the operation may be limited regardless of the user characteristics. Further, in the case where a user with a high level of operation skill performs a special operation different from a normal operation, the user's level of operation skill is relatively lowered. However, an input screen for the user with a high level of operation skill is displayed, resulting in a problem that sufficient operational assistance cannot be provided.

In contrast, with an electronic apparatus and an operation screen display method according to the present disclosure, it is possible to provide operational assistance corresponding to the user characteristics. For example, at the time of prompting the user to select a specific operation menu item from among a plurality of operation menu items so as to set a specific function, if there is a delay in the operation of selecting the operation menu item by the user, an operation menu item corresponding to a function that the user is used to operating is eliminated.

[Embodiment 1]

Figure 1:
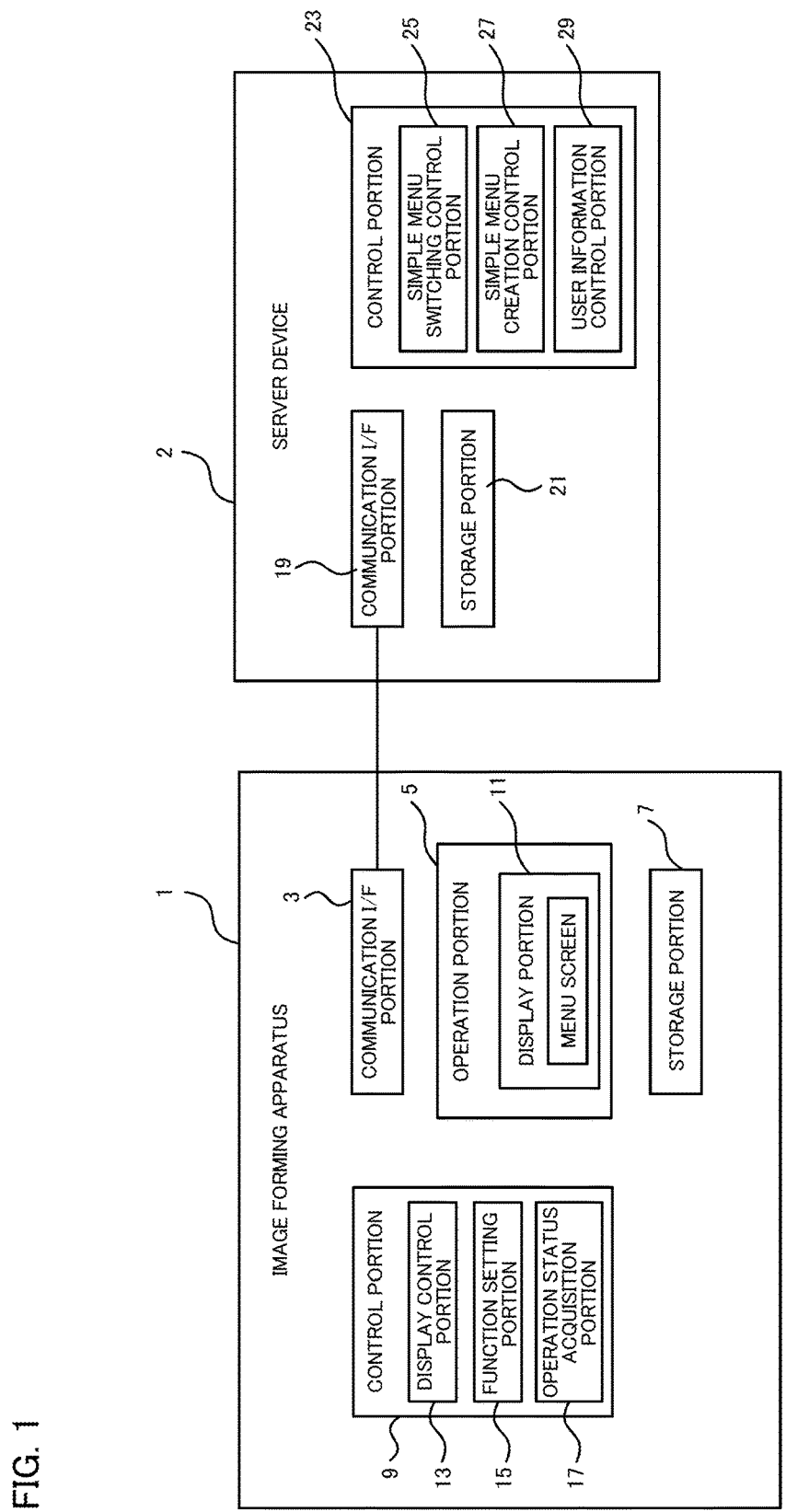
FIG. 1 shows a schematic configuration of an image forming apparatus serving as an electronic apparatus according to Embodiment 1 of the present disclosure.

[Image Forming Apparatus]FIG. 1 shows a schematic configuration of an image forming apparatus serving as an electronic apparatus according to Embodiment 1 of the present disclosure.

An image forming apparatus 1 serving as the electronic apparatus according to Embodiment 1 includes an external server device 2 connected thereto via a network or the like. Note that the image forming apparatus 1 may include the server device 2 as an internal server, or may only have the function of the server device 2.

The image forming apparatus 1 is, for example, a digital multifunction peripheral or the like, and has various functions, including, for example, a scanner function, a copy function, a print function, a facsimile function, and an email transmission function. Note that the image forming apparatus may have each of the various functions separately or in any combination. Specific configurations and the like of the various functions are well-known, and therefore, the description thereof is omitted.

During operation for setting the various functions and functions associated therewith, the image forming apparatus 1 according to Embodiment 1 prompts the user to select a specific operation menu from among a plurality of operation menu items, and displays a first simple menu or a second simple menu as necessary. At this time, the server device 2 functions as a control device that controls the switching between the first and second simple menus, together with a control portion 9 of the image forming apparatus 1.

The image forming apparatus 1 includes a communication interface (I/F) portion 3, an operation portion 5, a storage portion 7, the control portion 9, and so forth.

The communication I/F portion 3 is a network interface or the like, and transmits and receives data to and from the server device 2 and the like.

The operation portion 5 is an operation display device that includes one or more circuits and parts including a display portion 11 with a touch panel screen, a hard key, and the like, and allows for display of an operation input and an operation status to the image forming apparatus 1.

The storage portion 7 is a memory having a storage area, and serves as a storage device that includes a ROM (Read Only Memory) storing data and programs necessary for processing, a RAM (Random Access Memory) serving as a work area, an HDD (Hard Disk Drive) serving as an auxiliary storage device, and the like.

The control portion 9 is an arithmetic processing device that includes a CPU (central processing unit) and the like, and implements the various functions and the associated functions described above by executing programs to control various portions of the image forming apparatus 1. The control portion 9 according to Embodiment 1 functions as a display control portion 13, a function setting portion 15, and an operation status acquisition portion 17 by executing a display step, a function setting step, and an operation status acquisition step based on programs. The display control portion 13, the function setting portion 15, and the operation status acquisition portion 17 are modules that are implemented by a processor executing programs. Alternatively, the display control portion 13, the function setting portion 15, and the operation status acquisition portion 17 may be electronic circuits including electronic components or electronic substrates that execute various built-in programs.

The display control portion 13 implements a display control function, and selectably displays a plurality of operation menu items, which are soft keys, on the display portion 11 (see FIG. 2) and receives a selection operation performed by the user. For example, during execution of the copy function, the display control portion 13 displays operation menu items relating to sheet selection, enlargement/reduction, and the like on the display portion 11 such that the operation menu items are selectable by the user.

In Embodiment 1, under control of the display control portion 13, the display portion 11 displays a plurality of operation menu items on each of menu screens of a plurality of hierarchical levels, and switches, according to selection of an operation menu item of each of the hierarchical levels, the menu screen to the related menu screen of a lower hierarchical level.

Also, when first simple menu data or second simple menu data, which will be described later, is received, the display control portion 13 causes the display portion 11 to display the first simple menu or the second simple menu. In the case where the second simple menu is displayed, the display control portion 13 causes the display portion 11 to display, in advance, a switching selection screen for receiving selection as to whether or not to switch to the second simple menu. The switching selection screen according to Embodiment 1 is displayed as a selection pop-up.

The function setting portion 15 implements a function setting function, and receives user selection of a specific operation menu item from among the plurality of operation menu items on the display portion 11, and makes it possible to set a specific function among the various functions and the associated functions.

The function setting portion 15 according to Embodiment 1 sets a specific function by receiving selection of the operation menu items in a hierarchical order. For example, when the user performs operations to select operation menu items from among a plurality of menu screens in a hierarchical order, the function setting portion 15 sets a specific function when the operation menu item of the lowest layer in the series of operations is selected.

The operation status acquisition portion 17 implements an operation status acquisition function, and acquires the number of times of operation or the elapsed time since the start of operation when an operation to select an operation menu item is repeated without leading to setting of a specific function. The acquired number of times of operation and elapsed time are transmitted by the operation status acquisition portion 17 to the server device 2 side.

[Server Device]

The server device 2 includes a communication interface (I/F) portion 19, a storage portion 21, and a control portion 23.

The communication I/F portion 19 is a network interface or the like, and transmits and receives data to and from the image forming apparatus 1 and a client terminal.

The storage portion 21 is a memory having a storage area, and serves as a storage device that includes a ROM, a RAM, an HDD, and the like. The control portion 23 is an arithmetic processing device that includes a CPU and the like and executes programs to control various portions of the server device 2. The control portion 23 according to Embodiment 1 functions as a simple menu switching control portion 25 and a simple menu creation control portion 27 by executing a switching control step and a simple menu creation control step based on programs. For example, the simple menu switching control portion 25 and the simple menu creation control portion 27 are modules that are implemented by a processor executing programs. Alternatively, the simple menu switching control portion 25 and the simple menu creation control portion 27 may be electronic circuits including electronic components or electronic substrates that execute various built-in programs.

The simple menu switching control portion 25 determines whether or not to switch to the first simple menu or the second simple menu according to user information, a past usage status, the number of times of erroneous operation, and the time required to select a function.

That is, the simple menu switching control portion 25 implements a switching control function as a switching control portion, and determines whether the number of uses of the image forming apparatus 1 by a user who has logged in to the image forming apparatus 1 is less than or equal to a set number or the elapsed time since the last use of the image forming apparatus 1 is greater than or equal to a set time.

The number of uses is, for example, an accumulated number of uses or the number of uses within a specific period that indicates a use frequency of the image forming apparatus 1 by a user. The number of uses is incremented each time the user logs in to the image forming apparatus 1, and the incremented number of uses is stored in the storage portion 21. The elapsed time since the last use of the image forming apparatus 1 is an accumulated time from a logoff, which is the end of the last use of the image forming apparatus 1. The elapsed time is calculated at the next login by storing the time of the logoff in the storage portion 7. The set number for the number of uses and the set time for the elapsed time are stored as thresholds in the storage portion 21.

When the number of uses is less than or equal to the set number or a time greater than or equal to the set time has elapsed since the last use of the image forming apparatus 1, the user is determined to be a user who is unfamiliar with the operation of the image forming apparatus 1.

Further, in the case where a user who is familiar with the operation performs operation to select an operation menu item, the simple menu switching control portion 25 determines whether, without leading to setting of a specific function, the number of times of selection of the operation menu item is greater than or equal to the set number or the elapsed time since the start of selection of the operation menu item is greater than or equal to the set time.

The number of times of selection of the operation menu item in the case of not leading to setting of a specific function is increased by erroneous operation of traversing through the hierarchical levels of the operation menu items. The erroneous operation may be caused, for example, even by a user who is familiar with the operation if the user is unfamiliar with the operation of selecting an operation menu item that leads to setting of a specific function. For this reason, the simple menu switching control portion 25 determines whether the number of times of repetition of operation is greater than or equal to a set number. The set number is set to, but not is particularly limited to, two or more repetitions of operation caused by erroneous operation, rather than a single erroneous operation, and is stored as a threshold in the storage portion 21.

As the set time for the elapsed time since the start of operation, for example, a time interval corresponding to a time during which a general user performs two or more erroneous operations is stored as a threshold in the storage portion 21.

Figure 3:
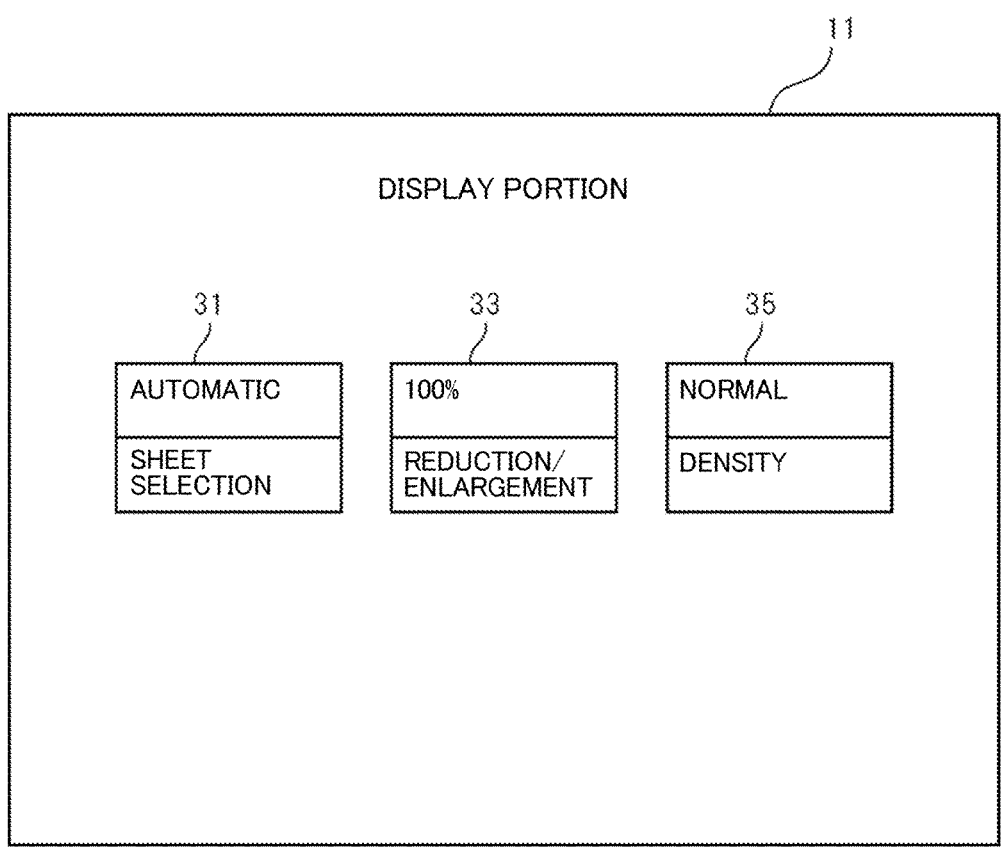
FIG. 3 shows a second simple menu obtained by eliminating operation menu items with a low number of uses from the menu screen in FIG. 2.

The simple menu creation control portion 27 implements a simple menu creation control function, and creates a second simple menu to be displayed on the display portion 11 to a user who is unfamiliar with the operation of the image forming apparatus 1, when the number of uses is less than or equal to the set number or a time greater than or equal to the set time has elapsed since the last use of the image forming apparatus 1 (see FIG. 3). Second simple menu data of the created second simple menu is transmitted to the display control portion 13 of the image forming apparatus 1.

Note, however, that the creation of the second simple menu is not be performed unless a creation instruction is provided from the display control portion 13 of the image forming apparatus 1. The creation instruction is transmitted by the display control portion 13 of the image forming apparatus 1 to the server device 2 side when the user selects to switch to the second simple menu via a selection pop up.

The second simple menu is obtained by eliminating, from a plurality of operation menu items, an operation menu item corresponding to a function whose number of uses by all users is less than or equal to a set number. In the case of the second simple menu according to Embodiment 1, an operation menu item corresponding to a function whose number of uses is less than or equal to the set number is eliminated from the menu screen of the first hierarchical level.

A function whose number of uses by all users is less than or equal to the set number is a function that is not often used, and the second simple menu can create a simple menu by narrowing down the functions to those with a high use frequency.

Whether the number of uses by all users of a function is less than or equal to the set number is determined based on the past usage history of the function. Here, the number of uses is an accumulated number of uses of each function by all users or a number of uses of each function by all users within a specific period that indicates a use frequency, and the use frequency is incremented each time the user who has logged in sets the function, and the incremented number of uses is stored in the storage portion 21. The set number for the number of uses fluctuates such that at least a smaller number of uses can be excluded when the number of uses of each function is relatively determined. Note, however, that the set number can be a specific number of uses serving as a threshold.

Figure 4:
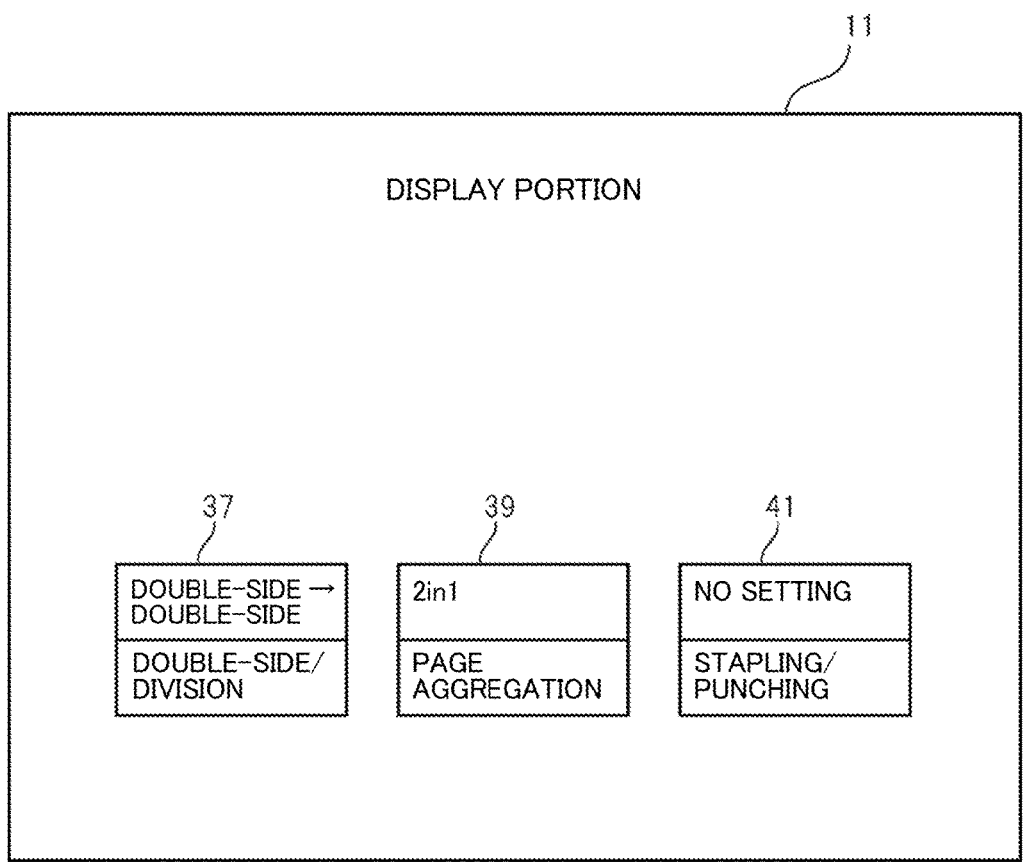
FIG. 4 shows a first simple menu obtained by eliminating operation menu items with a high use frequency from the menu screen in FIG. 2.

The simple menu creation control portion 27 creates a first simple menu to be displayed on the display portion 11 to a user who is familiar with the operation, when the number of times of selection of the operation menu item is greater than or equal to the set number or the elapsed time since the start of selection of the operation menu item is greater than or equal to the set time (see FIG. 4). First simple menu data of the created first simple menu is transmitted to the display control portion 13 of the image forming apparatus 1.

The first simple menu is obtained by eliminating, from a plurality of operation menu items being displayed on the display portion 11, an operation menu item corresponding to a function whose number of uses by the user is greater than or equal to a set number. In the case of the first simple menu according to Embodiment 1, an operation menu item corresponding to a function whose number of uses by the user is greater than or equal to the set number is eliminated from the menu screen of the first hierarchical level.

That is, when operation is repeated due to an erroneous operation, it is possible to create a simple menu in which the operation menu items are limited to those that are not ordinarily used by a user who is familiar with the operation.

Whether the number of uses of a function by a user is greater than or equal to the set number is determined from the past usage history of the function, similarly as in the case of the second simple menu. That is, the number of uses is an accumulated number of uses of each function by each individual user or a number of uses within a specific period that indicates a use frequency of each function by each individual user, and is incremented each time the user who has logged in sets the function, and the incremented number of uses is stored in the storage portion 21. The set number for the number of uses is set such that at least a larger number of uses can be excluded when the number of uses of each function is relatively determined. Note, however, that the set number can be a specific number of uses serving as a threshold.

[Operation Menu Items, Simple Menus]

Figure 2:
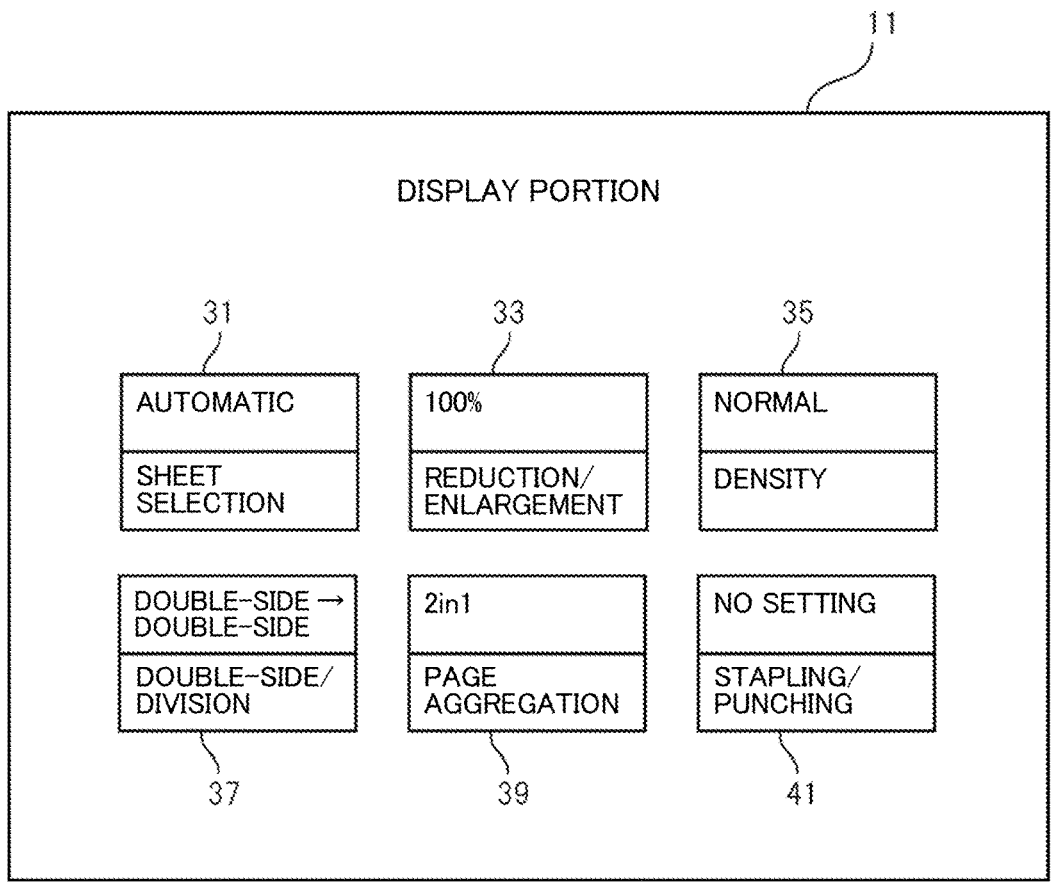
FIG. 2 shows an exemplary menu screen on a display portion of the image forming apparatus in FIG. 1.

FIG. 2 is a diagram illustrating an exemplary menu screen of normal display. FIG. 3 is a diagram illustrating an exemplary menu screen with the second simple menu. FIG. 4 is a diagram illustrating an exemplary menu screen with the first simple menu. Note that in FIGS. 3 and 4, only operation menu items are displayed, and the rest is omitted.

FIG. 2 illustrates a menu screen of normal display, showing a plurality of operation menu items of the first hierarchical level. As an example, a sheet selection item 31, a reduction/enlargement item 33, a density item 35, a double-side/division item 37, a page aggregation item 39, and a stapling/punching item 41 are displayed as the operation menu items.

To each of the items 31, 33, 35, 37, 39, and 41 of this hierarchical level, a plurality of operation menu items of a lower hierarchical level are linked. In Embodiment 1, menu screens of a plurality of hierarchical levels in such a hierarchical structure are provided, and a plurality of operation menu items are operated on the menu screens of the respective hieratical levels, and thereby, the plurality of operation menu items are switched and displayed in a hierarchical order as described above. By displaying and operating the operation menu items in a hierarchical order in this way, the desired function can be selected.

The menu screen with the second simple menu in FIG. 3 is obtained by eliminating, from the plurality of operation menu items in the normal display in FIG. 2, operation menu items with a low number of uses, and displaying the items 31, 33, and 35. Note that the second simple menu is not limited to the example shown in FIG. 3, and can be set arbitrarily.

The menu screen with the first simple menu in FIG. 4 is obtained by eliminating, from the plurality of operation menu items in the normal display in FIG. 2, operation menu items with a high number of uses, and displaying the items 37, 39, and 41. Note that the first simple menu is not limited to the example shown in FIG. 3, and can be set arbitrarily.

Operation Screen Display Process]

Figure 5:
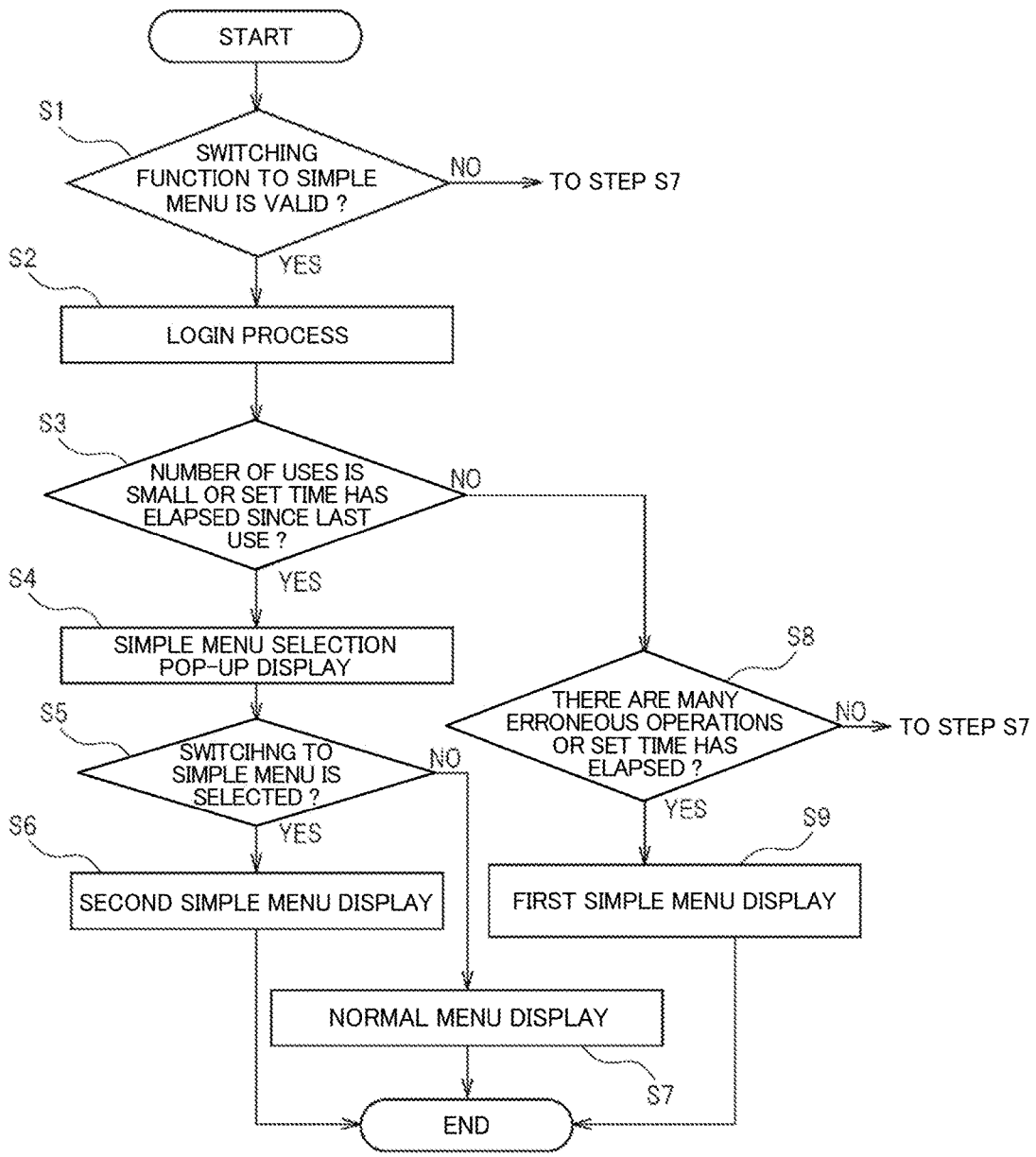
FIG. 5 shows steps of an operation screen display process for operational assistance provided by the image forming apparatus in FIG. 1.

FIG. 5 shows steps of an operation screen display process for operational assistance.

The operation screen display process is executed by implementing a display function, a function setting function, a switching control function, and a simple menu creation function in the image forming apparatus 1 and the server device 2.

Upon start of the operation screen display process, for example, by activation of the image forming apparatus 1, determination as to whether "switching function to the simple menu is valid?" is performed in step S1. This determination may be performed, for example, by the display control portion 13 of the image forming apparatus 1 determining whether a simple menu switching button is selected.

If the switching function is valid, the procedure proceeds to step S2 (YES). If the switching function is not valid, the procedure proceeds to step S7 (NO).

In step S2, "login process" is executed. That is, the image forming apparatus 1 receives a login of the user. A login can be performed by a well-known method. For example, a login is received by the image forming apparatus 1 through input of a user ID, a password, and the like, and the login process is executed by checking this information against login information such as a user ID and a password stored in the image forming apparatus 1 or the server device 2.

In the case of executing the login process in the server device 2, the user ID, the password, and the like that are input in the image forming apparatus 1 may be transmitted to the server device 2 to make a login request. Note that when the login process has been executed in the image forming apparatus 1, the image forming apparatus 1 notifies the server device 2 that the user has logged in to the image forming apparatus 1. When the login process is completed in this way, the procedure proceeds to step S3.

In step S3, determination as to whether "the number of uses is small or the set time has elapsed since the last use?" is performed. That is, in response to the user login to the image forming apparatus 1 in step S3, the simple menu switching control portion 25 of the server device 2 acquires the user information of the user who has logged in, from the storage portion 21.

Note that the user information includes, for example, the number of uses of the image forming apparatus 1 by the user who has logged in, the time and date of the last use, and the number of uses of each function of the image forming apparatus 1.

Based on the acquired user information, the simple menu switching control portion 25 determines whether the number of uses of the image forming apparatus 1 by the user who has logged in is less than or equal to a set number or the elapsed time since the last use of the image forming apparatus 1 is greater than or equal to a set time.

If the number of uses is less than or equal to the set number or the elapsed time is greater than or equal to the set time, the procedure proceeds to step S4 (YES), and, if not, the procedure proceeds to step S8 (NO).

Accordingly, it is possible, in step S3, to classify the user who has logged in, in terms of whether or not the user who has logged in is familiar with the operation of the image forming apparatus 1.

In step S4, "simple menu selection pop-up display" is performed. Here, first, the simple menu switching control portion 25 of the server device 2 transmits a display instruction of a pop-up to the image forming apparatus 1 in response to the determination performed in step S3.

In the image forming apparatus 1, based on the display instruction received by the display control portion 13, a selection pop-up for selecting whether or not to switch to the second simple menu is displayed on the display portion 11. When the selection pop-up is displayed in this way, the procedure proceeds to step S5.

In step S5, determination as to whether "switching to the simple menu is selected?" is performed. Here, first, the display control portion 13 of the image forming apparatus 1 receives selection of the selection pop-up on the display portion 11. When selection of the selection pop-up is received, the display control portion 13 of the image forming apparatus 1 transmits a creation instruction of the second simple menu to the server device 2 side.

Accordingly, at the server device 2 side, whether or not switching to the simple menu is selected is determined based on whether or not the simple menu creation control portion 27 has received a creation instruction of the second simple menu.

If switching to the simple menu is selected, the procedure proceeds to step S6 (YES), and, if not, the procedure proceeds to step S7 (NO). Note that whether or not the switching is selected may be determined during a specific time period, and it may be determined that switching is not selected when the specific time period has elapsed.

In step S6, "second simple menu display" is performed. That is, the simple menu creation control portion 27 of the server device 2 creates a second simple menu obtained by excluding, from the menu screen of normal display, operation menu items with a low number of uses, for example, as shown in FIG. 3, and transmits second simple menu data to the image forming apparatus 1. In the image forming apparatus 1, based on the received second simple menu data, the display control portion 13 displays the operation menu items on the display portion 11 by using a menu screen with the second simple menu.

Accordingly, a user who seems to be unfamiliar with the operation of the image forming apparatus 1 can easily perform operation while checking only those operation menu items with a high use frequency or a high number of uses.

In step S7, "normal menu display" is performed. That is, the display control portion 13 of the image forming apparatus 1 causes the display portion 17 to display the operation menu items by using a menu screen of normal display as shown in FIG. 2, for example.

Accordingly, even a user who seems to be unfamiliar with the operation of the image forming apparatus 1 can perform operation by using the menu screen of normal display according to the user's own will, rather than by using the simplified second simple menu.

In step S8, determination as to whether "there are many erroneous operations or the set time has elapsed?" is performed.

Here, the operation status acquisition portion 17 of the image forming apparatus 1 acquires the number of times of operation and the elapsed time since the start of operation when the operation has been repeated, without leading to setting of a specific function, due to an erroneous operation or the like of an operation menu item. The acquired number of times of operation and elapsed time are transmitted by the operation status acquisition portion 17 to the server device 2 side.

The simple menu switching control portion 25 of the server device 2 determines whether the received number of times of operation and elapsed time are greater than or equal to a set number and a set time, respectively. If the number of times of operation is greater than or equal to the set number or the elapsed time is greater than or equal to the set time, the procedure proceeds to step S9 (YES), and, if not, the procedure proceeds to step S7 (NO).

In step S9, "first simple menu display" is performed. That is, the simple menu creation control portion 27 of the server device 2 creates a first simple menu obtained by excluding, from the menu screen of normal display, operation menu items with a high number of uses, for example, as shown in FIG. 4, and transmits first simple menu data to the image forming apparatus 1. In the image forming apparatus 1, based on the received first simple menu data, the display control portion 13 causes the display portion 17 to display the operation menu items by using a menu screen with the first simple menu.

Accordingly, even a user who seems to be familiar with the operation of the image forming apparatus 1 can receive operational assistance by the first simple menu when an erroneous operation is caused by performing an unfamiliar operation that the user does not ordinarily use. With this operational assistance, it is possible to narrow down the operation menu items assuming that an operation menu item that is not ordinarily used is operated, and thereby to make the operation clear and simple.

[Effect of Embodiment 1]

As described above, the image forming apparatus 1 according to Embodiment 1 includes: a display portion 11 that selectably displays a plurality of operation menu items; a function setting portion 15 that is capable of receiving selection of a specific operation menu item from among the plurality of operation menu items on the display portion 11 and setting a specific function among the plurality of functions; a simple menu switching control portion 25 at the server device 2 side that determines whether, without the specific function being set, the number of times of selection of the operation menu item is greater than or equal to a set number or an elapsed time since start of selection of the operation menu item is greater than or equal to a set time; and a simple menu creation control portion 27 at the server device 2 side that creates, when it is determined that the number of times of selection is greater than or equal to the set number or the elapsed time is greater than or equal to the set time, a first simple menu for use in display on the display portion 11, the first simple menu being obtained by eliminating, from the plurality of operation menu items, an operation menu item corresponding to a function whose number of uses by a user is greater than or equal to a set number.

Accordingly, in Embodiment 1, if, without a specific function being set, the number of times of selection of an operation menu item is greater than or equal to the set number or the elapsed time since the start of operation is greater than or equal to the set time, it is possible to eliminate, from the display on the display portion, an operation menu item corresponding to a function whose number of uses by the user is greater than or equal to the set number, thus making it possible to provide appropriate operational assistance corresponding to the user characteristics.

That is, in Embodiment 1, even a user who seems to be familiar with the operation of the image forming apparatus 1 can receive operational assistance by the first simple menu display when an erroneous operation is caused by performing an unfamiliar operation that the user does not ordinarily use. With this operational assistance, it is possible to narrow down the operation menu items assuming that an operation menu item that is not ordinarily used is operated, and thereby to make the operation clear and simple.

Further, in Embodiment 1, the display portion 11 displays a plurality of operation menu items on each of menu screens of a plurality of hierarchical levels, the function setting portion 15 receives selection of operation menu items for a specific function in a hierarchical order. During creation of the first simple menu, the simple menu creation control portion 27 eliminates, from the plurality of operation menu items on the menu screen of the first hierarchical level, an operation menu item corresponding to a function whose number of uses by the user is greater than or equal to the set number.

Accordingly, in Embodiment 1, the narrowing-down of the operation menu items during creation of the first simple menu is performed on a menu screen of a higher hierarchical level and thus can be performed easily and reliably.

If the number of uses of the image forming apparatus 1 is less than or equal to the set number or the elapsed time since the last use thereof is greater than or equal to the set time, the simple menu switching control portion 25 causes the simple menu creation control portion 27 to create a second simple menu obtained by eliminating, from the plurality of operation menu items, an operation menu item corresponding to a function whose number of uses by all users is less than or equal to the set number.

Accordingly, it is possible to classify weather the user seems to be familiar with the operation of the image forming apparatus 1 in terms of the number of uses or the use frequency, and allow a user who seems to be unfamiliar with the operation to perform operation while checking only operation menu items with a high use frequency or a high number of uses. Consequently, it is possible to provide appropriate operational assistance corresponding to the user characteristics in a more reliable manner.

Then, if the number of uses of the image forming apparatus 1 is greater than the set number or the elapsed time since the last use thereof is less than the set time, the simple menu switching control portion 25 determines whether the number of times of selection of the operation menu item is greater than or equal to the set number or the elapsed time since the start of selection of the operation menu item is greater than or equal to the set time.

Accordingly, in Embodiment 1, it is possible to create the first simple menu for only a user who seems to be familiar with the operation, thus making it possible to prevent the first simple menu from being created for a user who is unfamiliar with the operation.

[Embodiment 2]

Figure 6:
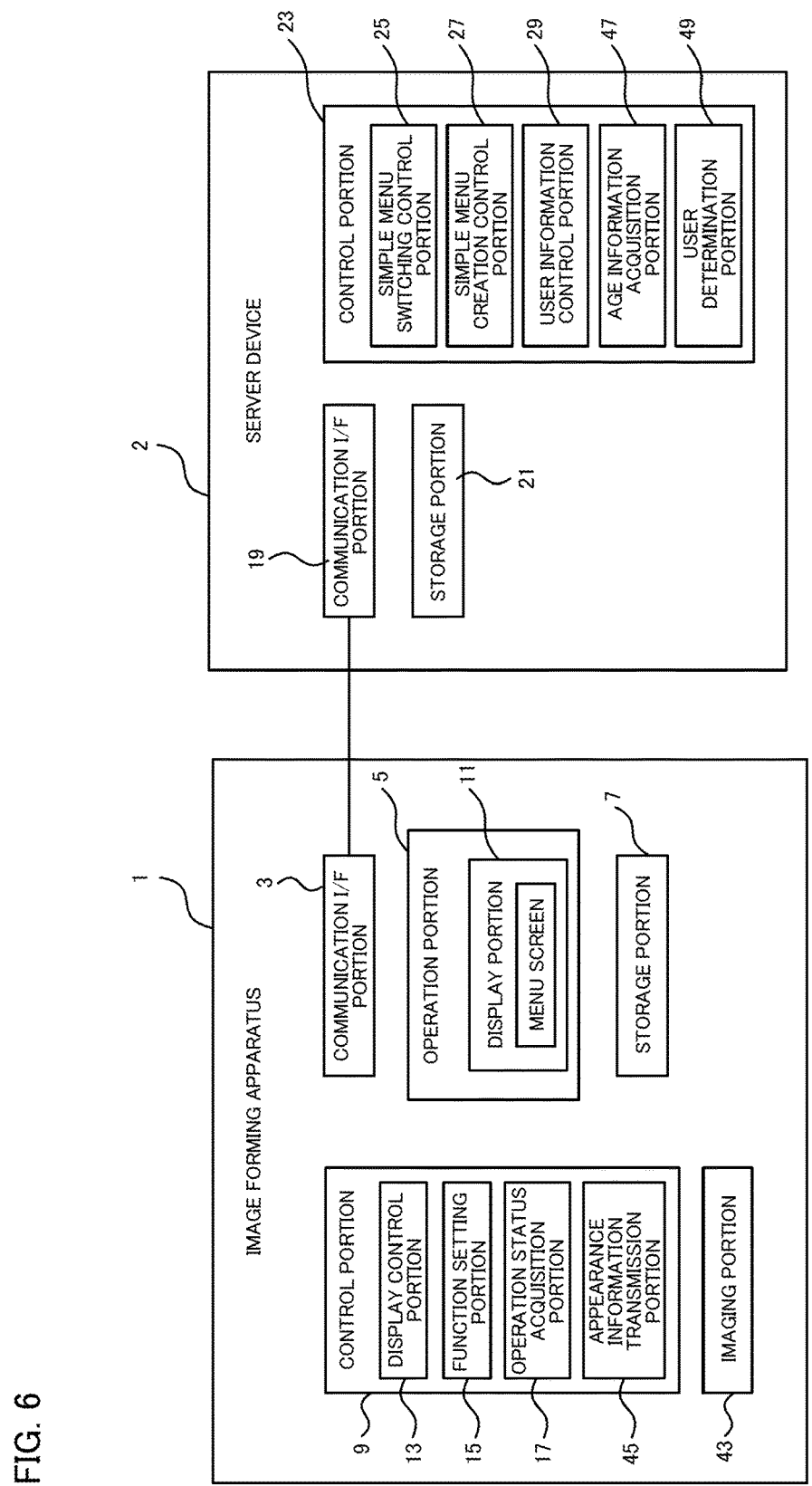
FIG. 6 shows a schematic configuration of an image forming apparatus serving as an electronic apparatus according to Embodiment 2 of the present disclosure.

FIG. 6 shows a schematic configuration of an image forming apparatus serving as an electronic apparatus according to Embodiment 2 of the present disclosure. Note that the basic configuration of Embodiment 2 is the same as that of Embodiment 1, and therefore, the corresponding components are denoted by the same reference numerals and the redundant description is omitted.

The image forming apparatus 1 according to Embodiment 2 allows the second simple menu to be created based on the age of the user. The age of the user can be determined from appearance information (image) obtained by imaging the user's appearance such as the face.

For this purpose, the image forming apparatus 1 includes an imaging portion 43 including a CCD camera or the like, and the control portion 9 also functions as an appearance information transmission portion 45. The appearance information transmission portion 45 implements an appearance information transmission function, and transmits the user's appearance information obtained by the imaging portion 43 to the server device 2 side. For example, the appearance information transmission portion 45 is a module implemented by a processor executing programs. Alternatively, the appearance information transmission portion 45 may be an electronic circuit including an electronic component or an electronic substrate that executes various built-in programs.

The server device 2 also functions as an age information acquisition portion 47 and a user determination portion 49 by the control portion 23 executing an age information acquisition step and a user determination step based on programs. For example, the age information acquisition portion 47 and the user determination portion 49 are modules implemented by a processor executing programs. Alternatively, the age information acquisition portion 47 and the user determination portion 49 may be electronic circuits including electronic components or electronic substrates that execute various built-in programs.

The age information acquisition portion 47 implements an age information acquisition function, and receives appearance information from the image forming apparatus 1, and determines the age of the user who has logged in, based on the appearance information. The determined age information may be added to the user information. Consequently, if the user information of the user who has logged in is acquired from the storage portion 21 and age information is contained in the acquired user information, the age information acquisition portion 47 can also acquire the age information.

The user determination portion 49 implements a user determination function, and causes the simple menu creation control portion 27 to create a second simple menu when the age of the user is less than or equal to a set lower limit age or greater than or equal to a set upper limit age.

Figure 7:
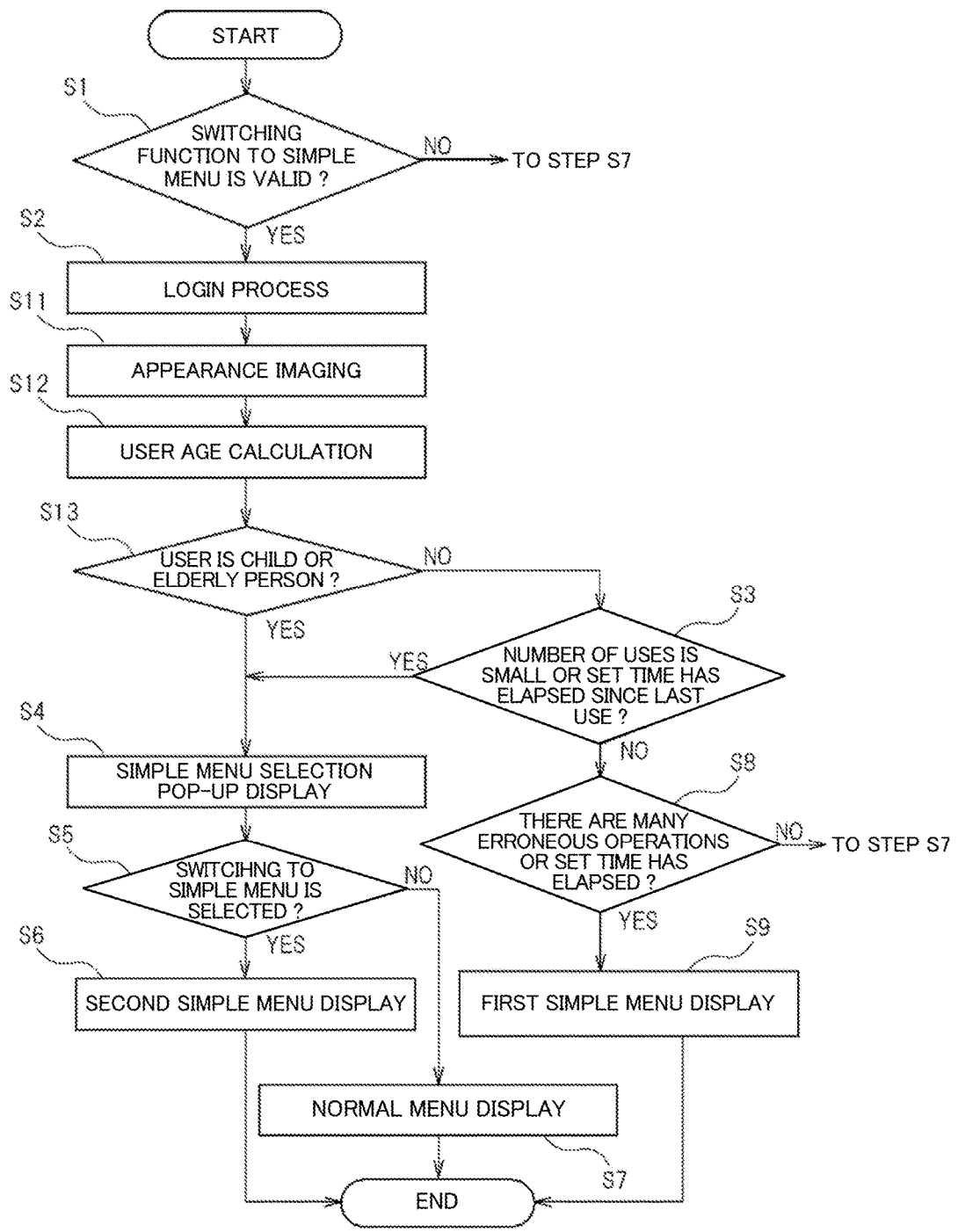
FIG. 7 shows steps of an operation screen display process for operational assistance provided by the image forming apparatus in FIG. 6.

FIG. 7 shows steps of an operation screen display process for operational assistance provided by the image forming apparatus in FIG. 6. This process is basically the same as the process shown in the flowchart in FIG. 5 of Embodiment 1. The same steps are denoted by the same reference numerals and the redundant description is omitted.

The flowchart in FIG. 7 is different from the flowchart in FIG. 5 in that steps S11, S12, and S13 are added so that whether the user who has logged in is a child or an elderly person is determined, and the procedure proceeds to step S3 or S4.

That is, in step S11, "appearance imaging" is performed to acquire, from the user who has logged in, the user's appearance information by imaging performed by the imaging portion 11, and the procedure proceeds to step S12.

In step S12, "user age calculation" is performed. Here, the appearance information transmission portion 45 of the image forming apparatus 1 transmits the appearance information to the server device 2 side. In the server device 2, the age information acquisition portion 47 calculates and acquires the user's age based on the received appearance information. When step S12 is completed in this way, the procedure proceeds to step S13.

In step S13, determination as to whether "the user is a child or an elderly person?" is performed. That is, the user determination portion 49 of the server device 2 determines whether the age of the user is less than or equal to the set lower limit age or greater than or equal to the set upper limit age. By this determination, it is determined whether the user is a child whose age is less than or equal to the lower limit age, or is an elderly person whose age is greater than or equal to the upper limit age.

If the user is a child or an elderly person, the procedure proceeds to step S4 (YES), and, if not, the procedure proceeds to S3 (NO). In either case, the same process as in Embodiment 1 is executed thereafter.

Accordingly, in Embodiment 2, it is possible to take into consideration whether the user is a child or an elderly person, thus making it possible to provide more appropriate operational assistance. That is, if the user is a child or an elderly person, it is possible to allow the user to easily perform the operation while checking only those operation menu items with a high use frequency or a high number of uses.

In addition, Embodiment 2 can also achieve the same advantageous effects as those achieved by Embodiment 1.

Although Embodiments 1 and 2 have described the case where the external server device 2 is connected to the image forming apparatus 1, it is possible to provide the server device 2 inside the image forming apparatus 1 as described above. In this case, the server device 2 may be incorporated into the image forming apparatus 1, and data transmission and reception between the server device 2 and the main body portion of the image forming apparatus 1 may be carried out via a bus. In the case of incorporating the function of the server device 2 into the image forming apparatus 1, the control portion 9 of the image forming apparatus 1 may function as the simple menu switching control portion 25, the simple menu creation control portion 27, and, optionally, as the age information acquisition portion 47 and the user determination portion 49.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An electronic apparatus comprising:
   a display that selectably displays a plurality of operation menu items;
   a function setting circuit that is capable of receiving selection of a specific operation menu item from among the plurality of operation menu items on the display and setting a specific function among a plurality of functions;
   a switching control circuit that determines whether, without the specific function being set, a number of times of selection of the operation menu item is greater than or equal to a set number or an elapsed time since start of selection of the operation menu item is greater than or equal to a set time; and
   a simple menu creation control circuit that creates, when it is determined by the switching control circuit that the number of times of selection is greater than or equal to the set number or the elapsed time is greater than or equal to the set time, a first simple menu for use in display on the display, the first simple menu being obtained by eliminating, from the plurality of operation menu items, an operation menu item corresponding to a function whose number of times of selection by a user is greater than or equal to a set number, wherein
   the switching control circuit determines whether a number of uses of the electronic apparatus by the user is less than or equal to a set number or an elapsed time since the last use of the electronic apparatus is greater than or equal to a set time, and, if the number of uses of the electronic apparatus is less than or equal to the set number or the elapsed time since the last use thereof is greater than or equal to the set time, the switching control circuit causes the simple menu creation control circuit to create a second simple menu obtained by eliminating, from the plurality of operation menu items, an operation menu item corresponding to a function whose number of uses by all users is less than or equal to a set number,
   the number of uses is incremented each time the user logs in to the electronic apparatus, and
   the elapsed time since the last use of the electronic apparatus is an accumulated time from a logoff.

2. The electronic apparatus according to claim 1, wherein
   the display displays a plurality of operation menu items on each of menu screens of a plurality of hierarchical levels,
   the function setting circuit receives selection of the operation menu item for the specific function in a hierarchical order, and
   during creation of the first simple menu, the simple menu creation control circuit eliminates an operation menu item corresponding to a function whose number of times of selection by the user is greater than or equal to the set number from the plurality of operation menu items on the menu screen of a first hierarchical level of the hierarchical levels.

3. The electronic apparatus according to claim 1, wherein
   if the number of uses of the electronic apparatus is greater than the set number or the elapsed time since the last use thereof is less than the set time, the switching control circuit determines whether the number of times of selection of the operation menu item is greater than or equal to the set number or the elapsed time since start of selection of the operation menu item is greater than or equal to the set time.

4. The electronic apparatus according to claim 1, further comprising:
   an age information acquisition circuit that acquires age information of the user; and
   a user determination circuit that causes, when an age of the user that corresponds to the acquired age information is less than or equal to a set lower limit age or greater than or equal to a set upper limit age, the simple menu creation control circuit to create a second simple menu obtained by eliminating, from the plurality of operation menu items, an operation menu item corresponding to a function whose number of uses by all users is less than or equal to a set number.

5. A non-transitory computer-readable storage medium having stored therein an operation screen display program for causing a computer to perform:
   selectably displaying a plurality of operation menu items;
   receiving selection of a specific operation menu item from among a plurality of operation menu items displayed by the displaying, and setting a specific function among a plurality of functions of an electronic apparatus;
   determining whether, without the specific function being set, a number of times of selection of the operation menu item is greater than or equal to a set number or an elapsed time since start of selection of the operation menu item is greater than or equal to a set time;
   when it is determined that the number of times of selection is greater than or equal to the set number or the elapsed time is greater than or equal to the set time, creating a first simple menu for use in the displaying, the first simple menu being obtained by eliminating, from the plurality of operation menu items, an operation menu item corresponding to a function whose number of uses by a user is greater than or equal to a set number; and,
   determining whether a number of uses of the electronic apparatus by the user is less than or equal to a set number or an elapsed time since the last use of the electronic apparatus is greater than or equal to a set time, and, if the number of uses of the electronic apparatus is less than or equal to the set number or the elapsed time since the last use thereof is greater than or equal to the set time, causing the simple menu creation control circuit to create a second simple menu obtained by eliminating, from the plurality of operation menu items, an operation menu item corresponding to a function whose number of uses by all users is less than or equal to a set number, wherein the number of uses is incremented each time the user logs in to the electronic apparatus, and the elapsed time since the last use of the electronic apparatus is an accumulated time from a logoff.

* * * * *